United States Patent
Wang et al.

(10) Patent No.: US 11,752,862 B2
(45) Date of Patent: Sep. 12, 2023

(54) DUAL-MODE ELECTRIC DRIVE AXLE WITH TORQUE PARALLEL COUPLING AND TORQUE VECTORING

(71) Applicant: Jilin University, Changchun (CN)

(72) Inventors: Junnian Wang, Changchun (CN); Chunlin Zhang, Changchun (CN); Changyang Guan, Changchun (CN); Zhe Liu, Changchun (CN); Shoulin Gao, Changchun (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 17/882,899

(22) Filed: Aug. 8, 2022

(65) Prior Publication Data

US 2022/0410684 A1    Dec. 29, 2022

(30) Foreign Application Priority Data

Aug. 12, 2021   (CN) .......................... 202110924396.9

(51) Int. Cl.
*B60K 17/04*    (2006.01)
*B60K 1/02*     (2006.01)
(Continued)

(52) U.S. Cl.
CPC .............. *B60K 17/046* (2013.01); *B60K 1/02* (2013.01); *B60K 17/165* (2013.01);
(Continued)

(58) Field of Classification Search
CPC ................ B60K 1/02; B60K 2001/001; B60K 2023/043; F16H 48/10–11; F16H 2048/368
See application file for complete search history.

(56) References Cited

U.S. PATENT DOCUMENTS 9,033,837 B2 * 5/2015 Smetana .................... F16H 1/36
                                                    475/5
9,638,302 B2 * 5/2017 Smetana .................. B60K 1/02
(Continued)

FOREIGN PATENT DOCUMENTS

CN        106965659 A      7/2017
CN        106965660 A  *   7/2017
(Continued)

*Primary Examiner* — Ernesto A Suarez
*Assistant Examiner* — James J Taylor, III (57) ABSTRACT

A dual-mode electric drive axle with torque parallel coupling and torque vectoring, including: a main motor, an auxiliary motor, a spur gear differential, a first half shaft, a second half shaft, a primary reducer, a secondary reducer, a dual-planetary gear set mechanism, a first clutch, a second clutch and a primary housing. The main motor and the auxiliary motor are respectively connected to input ends of the primary reducer and the secondary reducer. Output ends of the primary reducer and the secondary reducer are respectively connected to a housing of the spur gear differential and a gear ring of the dual-planetary gear set mechanism. A planet carrier of the dual-planetary gear set mechanism is connected to a sun gear through a first clutch, and a gear ring through a second clutch. A characteristic parameter of the dual-planetary gear set mechanism is 2.

7 Claims, 5 Drawing Sheets

(51) Int. Cl.
*B60K 17/16* (2006.01)
*F16H 48/11* (2012.01)
*F16H 48/36* (2012.01)
*B60K 23/04* (2006.01)

(52) U.S. Cl.
CPC ........ *B60K 2023/043* (2013.01); *F16H 48/11* (2013.01); *F16H 2048/368* (2013.01)

(56) References Cited

U.S. PATENT DOCUMENTS

| | | | | |
|---|---|---|---|---|
| 9,855,830 | B2* | 1/2018 | Knoblauch | B60K 1/00 |
| 10,226,999 | B2* | 3/2019 | Wang | B60K 6/445 |
| 10,232,705 | B2* | 3/2019 | Wang | B60K 17/08 |
| 11,498,435 | B2* | 11/2022 | Hebert | B60K 1/04 |

FOREIGN PATENT DOCUMENTS

| | | | | |
|---|---|---|---|---|
| CN | 106965662 A | | 7/2017 | |
| DE | 102016220630 A1 * | | 4/2018 | ............. B60K 1/00 |

* cited by examiner

DUAL-MODE ELECTRIC DRIVE AXLE WITH TORQUE PARALLEL COUPLING AND TORQUE VECTORING

CROSS-REFERENCE TO RELATED APPLICATIONS

This application claims the benefit of priority from Chinese Patent Application No. 202110924396.9, filed on Aug. 12, 2021. The content of the aforementioned application, including any intervening amendments thereto, is incorporated herein by reference in its entirety.

TECHNICAL FIELD

This application relates to electric vehicle transmissions, and more particularly to a dual-mode electric drive axle with torque parallel coupling and torque vectoring.

BACKGROUND

Electric vehicles (EVs) featuring zero fuel consumption, high integration, fast dynamic response and excellent driving performance have achieved outstanding development, and have been extensively popularized in recent years. In order to conform to the developing tendency of high performance, diversification, and individuation, the EVs have growing demand for advanced driving technologies that can improve the chassis performances, such as the electric torque vectoring (TV) technology.

The TV technology can realize the arbitrary transfer of the driving torque generated by the power source between left and wheels at the second sides, or between front and rear axles. By means of the TV technology, the driving torque can be transferred from a low-speed wheel (or axle) to a high-speed wheel (or axle), or reversely transferred. Hence, the TV technology can overcome the defect in the traditional open differentials that "the speeds of two-side wheels can be different, but the torque of them is always equal", so as to improve the control flexibility and steering maneuverability, balance the road adhesion utilization rate of tires, and increase the stability margin of the vehicle, effectively enhancing the handling stability of the vehicle. In addition, this technology can perform the driving torque distribution among four wheels to achieve the goal of energy saving.

Currently, this technology is mainly divided into two categories. One is the torque vectoring control technology applied to distributed-drive-type vehicles represented by in-wheel-motor-drive vehicles, which can achieve the torque vectoring distribution between wheels by directly controlling driving torque of the in-wheel motor of each wheel. However, low power density of the in-wheel motor and increased unsprung mass greatly limit the application of the torque vectoring distribution control technology in automobiles. The other is the torque vectoring differentials (TVDs) (drive axles) applied to centralized driving, which have been applied in some high-end sports cars and high-end sport utility vehicles (SUVs), such as Honda's super handling-all wheel drive (SH-AWD), Mitsubishi's super-all wheel control (SAYC) system and Audi's sport differentials. However, these TVDs are mainly applied on traditional fuel vehicles, and generally use a mechanical torque vectoring distribution mechanism such as multi-disc clutch, resulting in limited torque transfer capacity, reduced mechanical transmission efficiency, low reliability, high cost and complex structure.

In addition, improving the transmission efficiency of electric vehicles and reducing the loss of battery energy are critical to ensure the range of electric vehicles. The traditional single-motor drive axle can only choose high-power motors to meet the power requirements under extreme working conditions, which will cause the phenomenon "a big horse hauls a small carriage", and make the utilization rate of high-efficiency range of the motor low. By comparison, the dual-motor coupling drive technology allows the vehicle to switch to the main motor alone drive when the required driving torque is relatively small, and switch to the dual-motor torque coupling mode when the required driving torque is relatively large, so as to improve the loading rate and the high-efficiency range utilization rate of the driving motor, extending the range.

So far, it has been rarely reported about the application of the dual-motor parallel coupling driving for efficient driving and energy saving, and the torque vectoring drive axle for improving steering maneuverability and handling stability on electric vehicles, only Chinese patent application publication No. 106965659A, titled "Dual-motor coupling drive axle with torque vectoring function", and Chinese patent application publication No. 106965662A, titled "Dual-motor coupling drive axle with torque vectoring function" mention the related technical content. On the basis of achieving the torque vectoring function, these patent references enable transformation of the torque vectoring control motor, which is usually unoperated under straight driving conditions, into an assisted motor capable of participating in the driving by controlling the switching of the four sets of clutches, so as to achieve the dual-motor torque coupling driving, improving the dynamic performance under the working conditions with large torque demand, such as climbing and rapid acceleration. In addition, through the distribution and regulation of the coupled power of the two motors, the respective high-efficiency range can be fully utilized, so as to realize the energy-saving and high-efficiency driving. However, this technical solution requires four sets of clutches, seven planetary gear sets, resulting in complex structure, large axial length and great control difficulty.

In view of the defects existing in the prior art, this application proposes a dual-mode electric drive axle with torque parallel coupling and torque vectoring for a centralized-layout electric vehicle, in which two sets of clutches in conjunction with three planetary gear sets is used to reach the operation under three modes, respectively main motor independent drive mode, dual-motor torque coupling mode and torque vectoring mode. The drive axle can effectively improve the steering stability, trafficability, power performance and economic efficiency of the electric vehicles by switching between different working modes, having a brilliant application prospect.

SUMMARY

An object of this application is to provide a dual-mode electric drive axle with torque parallel coupling and torque vectoring, which has a compact structure, and can achieve the switching among three working modes, including: main motor independent-drive mode, a dual-motor torque coupling mode and torque vectoring (TV) mode. By controlling the working states of the two sets of clutches, the dual-mode electric drive axle can be switched among the three working modes.

Under the main motor independent-drive mode, only the main motor outputs torque, which is mainly used in the conditions where the driving torque demand is relatively small, so as to improve the loading rate of the main motor, and allow the main motor to work in the high-efficiency range, reducing the efficiency loss of the main motor.

Under the dual-motor torque coupling mode, the torque of an auxiliary motor is coupled with the torque output by the main motor to drive the vehicle, improving the dynamics performance of the vehicles. The dual-motor torque coupling mode is mainly used in the working conditions with relatively large torque demand, such as climbing and rapid acceleration. In addition, through the distribution and regulation of the coupled power of the main motor and the auxiliary motor, the respective high-efficiency range the main motor and the auxiliary motor can be fully utilized, so as to realize the energy-saving and high-efficiency driving.

Under the torque vectoring mode, the driving torque output by the dual-mode electric drive axle can be arbitrarily distributed between the half shafts at two sides, which overcomes the defect in the traditional open differentials that "the speeds of two-side wheels can be different, but the torque of them is always equal", effectively enhancing the handling stability of the vehicle, increasing the driving pleasure of the driver, and allowing for better economic efficiency and trafficability.

Technical solutions of the present disclosure are described as follows.

This application provides a dual-mode electric drive axle with torque parallel coupling and torque vectoring, comprising:
  a main motor;
  an auxiliary motor;
  a first flange;
  a second flange;
  a first half shaft;
  a second half shaft;
  a spur gear differential;
  a primary reducer;
  a secondary reducer;
  a dual-planetary gear set mechanism;
  a first clutch;
  a second clutch;
  a primary housing; and
  a secondary housing;
  wherein the main motor is configured to output a driving torque to drive a vehicle;
  the auxiliary motor is configured to output a torque to realize torque vectoring, or configured to output a torque to be coupled with the driving torque output by the main motor to drive the vehicle;
  the spur gear differential is configured to evenly distribute a torque transmitted thereto to the first half shaft and the second half shaft, allow the first half shaft and the second half shaft to rotate at different angular speeds, and receive the torque from the auxiliary motor to achieve torque coupling or torque vectoring;
  the primary reducer is configured to perform deceleration and torque increase, and transmit the driving torque output by the main motor;
  the secondary reducer is configured to perform deceleration and torque increase, and transmit the torque output the auxiliary motor;
  the dual-planetary gear set mechanism is configured to convert a torque output by the secondary reducer into a pair of equal torques having the same direction;
  the first clutch is configured to control the dual-mode electric drive axle to switch to a torque vectoring mode;
  the second clutch is configured to control the dual-mode electric drive axle to switch to a dual-motor torque coupling mode;
  the primary housing is configured to accommodate the primary reducer and the spur gear differential, and fix the main motor; and
  the secondary housing is arranged at a side of the primary housing, and is boltedly connected to the primary housing; and the secondary housing is configured to accommodate the secondary reducer and the dual-planetary gear set mechanism, and fix the auxiliary motor.

In some embodiments, the main motor is a hollow-shaft inner-rotor permanent magnet synchronous motor; the main motor, the second flange and the second half shaft are arranged at a first side of the spur gear differential; the driving torque generated by the main motor is output by a rotor shaft of the main motor; and the second half shaft passes through a center hole of the rotor shaft of the main motor.

In some embodiments, between the rotor shaft of the main motor and a main motor housing is provided with a rubber seal ring for sealing.

In some embodiments, the auxiliary motor is a hollow-shaft inner-rotor permanent magnet synchronous motor; the auxiliary motor, the first flange and the first half shaft are arranged at a second side of the spur gear differential; the torque generated by the auxiliary motor is output by a rotor shaft of the auxiliary motor; and the first half shaft passes through a center hole of the rotor shaft of the auxiliary motor.

In some embodiments, between the rotor shaft of the auxiliary motor and an auxiliary motor housing is provided with a rubber seal ring for sealing.

In some embodiments, the spur gear differential is a compact dual-cylindrical planetary gear set differential; and
  the spur gear differential comprises a first sun gear, a second sun gear, a first planetary gear, a second planetary gear, a first gear ring, a second gear ring, a first planet carrier, a second planet carrier and a needle roller thrust bearing; the first sun gear is in splined connection with an inner end of the first half shaft; the second sun gear is in splined connection with an inner end of the second half shaft; the first planetary gear is in external engagement with the first sun gear for transmission; the second planetary gear is in external engagement with the second sun gear and the first planetary gear for transmission; the first gear ring is in internal engagement with the first planetary gear for transmission; the second gear ring is in internal engagement with the second planetary gear for transmission; the first planet carrier is configured to rotatably support the first planetary gear and the second planetary gear; the second planet carrier is configured to rotatably support the first planetary gear and the second planetary gear; the first planet carrier is in pin connection with the second planet carrier to form a differential housing; and the needle roller thrust bearing is arranged between the first sun gear and the second sun gear.

In some embodiments, a main body of the primary reducer is a single-row single-stage planetary gear mechanism;
  the primary reducer comprises a third sun gear, a third gear ring, a third planetary gear, a first planetary gear shaft, a third planet carrier and a fourth planet carrier; and
  the third sun gear is in splined connection with the rotor shaft of the main motor; the third gear ring is fixedly connected to the primary housing; the third planetary gear is engaged with the third sun gear and the third gear ring for transmission; the first planetary gear shaft is configured to rotatably support the third planetary gear; the third planet carrier is configured to rotatably support the first planetary gear shaft, and is fixedly connected to the second planet carrier; the fourth planet carrier is configured to rotatably support the first planetary gear shaft, and is rotatably supported on a main motor housing; and the third planet carrier is in pin connection with the fourth planet carrier.

In some embodiments, the third gear ring is in splined connection with the primary housing.

In some embodiments, the third planet carrier is in splined connection with the fourth planet carrier.

In some embodiments, a main body of the spur gear differential is a compact dual-cylindrical planetary gear set differential;

the secondary reducer comprises a third sun gear, a third gear ring, a third planetary gear, a first planetary gear shaft, a third planet carrier and a fourth planet carrier; and the third sun gear is in splined connection with the rotor shaft of the auxiliary motor; the third gear ring is fixedly connected to the secondary housing; the third planetary gear is engaged with the third sun gear and the third gear ring for transmission; the first planetary gear shaft is configured to rotatably support the third planetary gear; the third planet carrier is configured to rotatably support the first planetary gear shaft, and is rotatably supported on an auxiliary motor housing; the fourth planet carrier is configured to rotatably support the first planetary gear shaft; and the third planet carrier is in pin connection with the fourth planet carrier.

In some embodiments, the third gear ring is in splined connection with the secondary housing.

In some embodiments, a main body of the dual-planetary gear set mechanism is a single-row two-stage planetary gear mechanism with a characteristic parameter of 2;

the dual-planetary gear set mechanism comprises a fourth sun gear, a first internal planetary gear, a first internal planetary gear shaft, a first external planetary gear, a first external planetary gear shaft, a fourth gear ring, a fifth planet carrier and a sixth planet carrier; and the third sun gear is in splined connection with the rotor shaft of the main motor; the third gear ring is fixedly connected to the primary housing; the third planetary gear is engaged with the third sun gear and the third gear ring for transmission; the first planetary gear shaft is configured to rotatably support the third planetary gear; the third planet carrier is configured to rotatably support the first planetary gear shaft, and is fixedly connected to the second planet carrier; the fourth planet carrier is configured to rotatably support the first planetary gear shaft, and is rotatably supported on a main motor housing; and the third planet carrier is in pin connection with the fourth planet carrier.

In some embodiments, the fourth sun gear is in splined connection with the first gear ring.

In some embodiments, the fourth gear ring is in splined connection with the fourth planet carrier.

In some embodiments, the first flange is in splined connection with an outer end of the first half shaft, so as to output a torque of the first half shaft to wheels at a first side of the vehicle; and a first fixing nut is threadedly connected to the first half shaft at an outer center of the first flange to axially fix the first flange.

In some embodiments, between the first flange and the auxiliary motor housing is provided with a rubber seal ring for sealing.

In some embodiments, the second flange is in splined connection with an outer end of the second half shaft, so as to output a torque of the second half shaft to wheels at a second side of the vehicle; and a second fixing nut is threadedly connected to the second half shaft at an outer center of the second flange to axially fix the second flange.

In some embodiments, between the second flange and the auxiliary motor housing is provided with a rubber seal ring for sealing.

In some embodiments, a driving part of the first clutch is in splined connection with the sixth planet carrier; and a driven part of the first clutch is in splined connection with the fourth sun gear; and a driving part of the second clutch is integrally formed with the driving part of the first clutch; and a driven part of the second clutch is integrally formed with the second gear ring.

The multi-mode electric drive axle using a one-way clutch can operate under the main motor independent-drive mode, the dual-motor torque coupling mode and the TV mode. By controlling the clutch, the dual-mode electric drive axle can be switched between the above-mentioned three modes, and the operation principles will be illustrated below.

When the dual-mode electric drive axle operates in the main motor independent-drive mode, the first clutch and the second clutch are both in a disengaged state. At this time, the main motor generates the driving torque, and the auxiliary motor does not participate in transmission, and is in a static state. Under the main motor independent-drive mode, the primary reducer performs deceleration and torque increase, and transmits the driving torque to the spur gear differential. Then, the driving torque is evenly distributed to the first half shaft and the second half shaft through the spur gear differential. The torque of the first half shaft is $T_l$ and the torque of the second half shaft is $T_r$, and $$T_l = T_r = \frac{1}{2}(k_1 + 1)T_{m1},$$

where kF is a planetary-row characteristic parameter of the primary reducer, and $T_{m1}$ is the driving torque generated by the main motor.

When the dual-mode electric drive axle operates in the dual-motor torque coupling mode, the first clutch is in a disengaged state, and the second clutch is in an engaged state. At this time, the main motor and the auxiliary motor both output a torque. Under the dual-motor torque coupling mode, the primary reducer performs deceleration and torque increase, and transmits the driving torque to the spur gear differential. Then, the driving torque is evenly distributed to the first half shaft and the second half shaft through the spur gear differential. The auxiliary motor rotates forward to generate a positive torque. The secondary reducer performs deceleration and torque increase, and transmits the positive torque from the auxiliary motor to the fourth gear ring of the dual-planetary gear set mechanism, which is then transformed into a pair of torques having the same magnitude and direction, where one of the pair of torques is transmitted through the fourth sun gear and the first gear ring of the spur gear differential to the first planetary gear of the spur gear differential; and the other of the pair of torques is transmitted through the sixth planet carrier, the second clutch and the second gear ring of the spur gear differential to the second planetary gear of the spur gear differential. The torques to the first planetary gear and the second planetary gear of the spur gear differential are then evenly distributed to the first half shaft and the second half shaft. Moreover, the dual-planetary gear set mechanism has a "differential" function under this mode to ensure that the torque generated by the auxiliary motor can be evenly distributed to the first half shaft and the second half shaft even when rotational speeds of the first half shaft and the second half shaft are different. At this time, $$T_l = T_r = \frac{1}{2}(k_1 + 1)T_{m1} + \frac{1}{2}(k_3 + 1)T_{m2},$$

where $k_3$ is a planetary-row characteristic parameter of the secondary reducer, and $T_{m2}$ is the torque generated by the auxiliary motor.

When the dual-mode electric drive axle operates in the TV mode, the first clutch is in an engaged state, and the second clutch is in a disengaged state. Under the TV mode, the primary reducer performs deceleration and torque increase, and transmit the driving torque from the main motor to the spur gear differential to be evenly distributed to the first half shaft and the second half shaft. The secondary reducer performs deceleration and torque increase, and transmits the torque from the auxiliary motor to the fourth gear ring of the dual-planetary gear set mechanism. Due to the engagement of the first clutch, the sixth planet carrier of the dual-planetary gear set mechanism is connected to the sun gear of the dual-planetary gear set mechanism through the first clutch to enable the self-locking of the dual-planetary gear set mechanism. The torque transmitted to the fourth gear ring of the dual-planetary gear set mechanism is transmitted through the dual-planetary gear set mechanism, the first clutch and the first gear ring of the spur gear differential to the first planetary gear of the spur gear differential, such that a torque of one half shaft reduces and a torque of the other half shaft increases. At this time, the torque of the first half shaft is expressed as:

$$T_l = \frac{1}{2}(k_1 + 1)T_{m1} - \frac{1}{2}\frac{(k_3 + 1)}{k_0}T_{m2};$$

and the torque of the second half shaft is expressed as:

$$T_r = \frac{1}{2}(k_1 + 1)T_{m1} + \frac{1}{2}\frac{(k_3 + 1)}{k_0}T_{m2},$$

where $k_0$ is a planetary-row characteristic parameter of the spur gear differential.

Compared to the prior art, this application has the following beneficial effects.

1. The dual-mode electric drive axle provided herein can achieve the torque vectoring distribution between left and wheels at the second sides on the centralized-drive electric vehicle by controlling an output torque of the auxiliary motor, such that the centralized-drive electric vehicles have similar dynamic controlling characteristics to the distributed-drive electric vehicles. In addition, compared with the traditional electronic stability program (ESP) technology, the drive axle provided herein avoids the power loss, and can effectively improve the dynamic, economic efficiency, handling stability, active safety and driving pleasure of the vehicle.

2. Regarding the dual-mode electric drive axle provided herein, the switching among three working modes can be realized under the control of a single actuator, which effectively reduces the production cost and control difficulty. In addition, the drive axle provided herein only uses three planetary gear sets and a dual-gear mechanism, which facilitates improving the overall integration and structure compactness, and reducing the size, improving the utilization rate of the vehicle chassis space and facilitating the arrangement of the chassis.

3. The dual-mode electric drive axle provided herein can operate under the main motor independent-drive mode and the dual-motor torque coupling mode. Under the working condition where the driving torque required by the vehicle is relatively small, the dual-mode electric drive axle is switched to the main motor independent-drive mode, and the main motor drives the vehicle alone, which can effectively improve the load rate of the main motor, so as to allow the main motor to work in the high-efficiency range and enhance the economic efficiency of the vehicle.

DETAILED DESCRIPTION OF EMBODIMENTS

The disclosure will be clearly and completely described below with reference to the accompanying drawings and embodiments.

A multi-mode torque-vectoring electric drive axle using a one-way clutch will be described below with reference to the accompanying drawings and embodiments.

Figure 1:
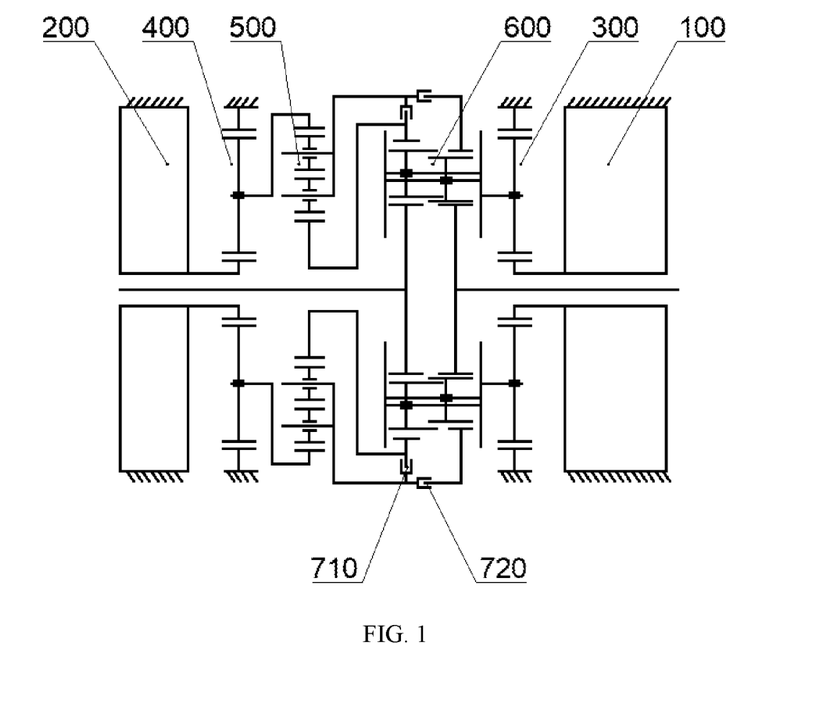
FIG. 1 is a simplified structural diagram of a dual-mode electric drive axle with torque parallel coupling and torque vectoring according to an embodiment of the present disclosure.
Figure 2:
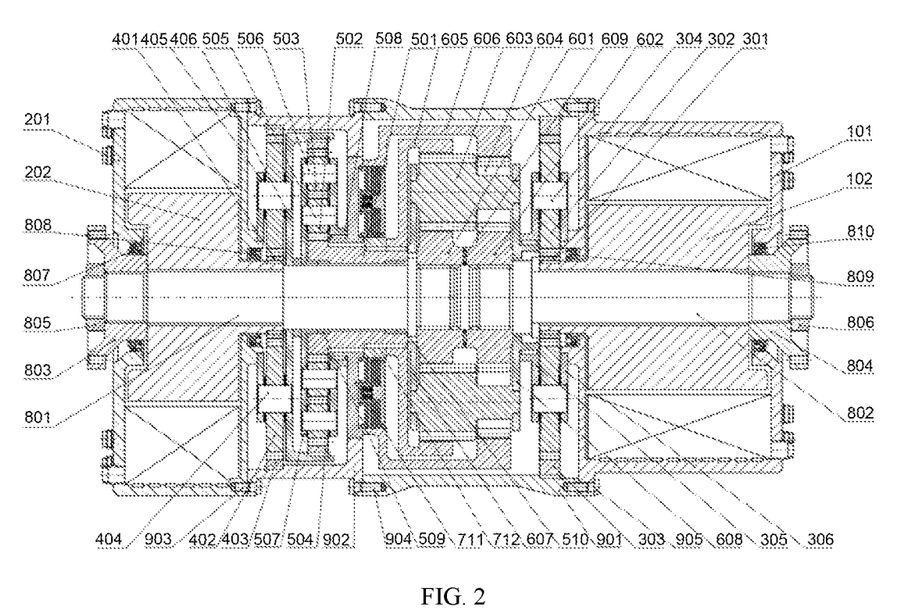
FIG. 2 structurally depicts the dual-mode electric drive axle according to an embodiment of the present disclosure.

As shown in FIGS. 1-2, a dual-mode electric drive axle with torque parallel coupling and torque vectoring includes a main motor 100, an auxiliary motor 200, a spur gear differential 600, a first flange 803, a second flange 804, a first half shaft 801, a second half shaft 802, a primary reducer 300, a secondary reducer 400, a dual-planetary gear set mechanism 500, a first clutch 710, a second clutch 720, a primary housing 901 and a secondary housing 902.

The main motor 100 is a hollow-shaft inner-rotor permanent magnet synchronous motor. The main motor 100, the second flange 804 and the second half shaft 802 are arranged at a first side of the spur gear differential 600. The driving torque generated by the main motor is output by a rotor shaft 102 of the main motor 100. The second half shaft 802 passes through a center hole of the rotor shaft 102. Between the rotor shaft 102 and a main motor housing 101 is provided with a third rubber seal ring 809 for sealing.

The auxiliary motor 200 is a hollow-shaft inner-rotor permanent magnet synchronous motor. The auxiliary motor 200, the first flange 803 and the first half shaft 801 are arranged at a second side of the spur gear differential 600. The torque generated by the auxiliary motor 200 is output by a rotor shaft 202 of the auxiliary motor 200. The first half shaft 801 passes through a center hole of the rotor shaft 202. Between the rotor shaft 202 and an auxiliary motor housing 201 is provided with a second rubber seal ring 808 for sealing.

The spur gear differential 600 is a compact dual-cylindrical planetary gear set differential. The spur gear differential 600 includes a first sun gear 601, a second sun gear 602, a first planetary gear 603, a second planetary gear 604, a first gear ring 605, a second gear ring 606, a first planet carrier 607, a second planet carrier 608 and a needle roller thrust bearing 609.

The first sun gear 601 is in splined connection with an inner end of the first half shaft 801. The second sun gear 602 is in splined connection with an inner end of the second half shaft 802. The first planetary gear 603 is in external engagement with the first sun gear 601 for transmission. The second planetary gear 604 is in external engagement with the second sun gear 602 and the first planetary gear 603 for transmission. The first gear ring 605 is in internal engagement with the first planetary gear 603 for transmission. The second gear ring 606 is in internal engagement with the second planetary gear 604 for transmission. The first planet carrier 607 is configured to rotatably support the first planetary gear 603 and the second planetary gear 604. The second planet carrier 608 is configured to rotatably support the first planetary gear 603 and the second planetary gear 604. The first planet carrier 607 is in pin connection with the second planet carrier 608 to form a differential housing. The needle roller thrust bearing 609 is arranged between the first sun gear 601 and the second sun gear 602 to reduce frictional resistance therebetween.

A main body of the primary reducer 300 is a single-row single-stage planetary gear mechanism. The primary reducer 300 includes a third sun gear 301, a third gear ring 303, a third planetary gear 302, a first planetary gear shaft 304, a third planet carrier 305 and a fourth planet carrier 306.

The third sun gear 301 is in splined connection with the rotor shaft 102. The third gear ring 303 is fixedly and in splined connection with the primary housing 901. The third planetary gear 302 is engaged with the third sun gear 301 for transmission, and with the third gear ring 303 for transmission. The first planetary gear shaft 304 is configured to rotatably support the third planetary gear 302. The third planet carrier 305 is configured to rotatably support the first planetary gear shaft 304, and is in splined connection with the second planet carrier 608. The fourth planet carrier 306 is configured to rotatably support the first planetary gear shaft 304, and is rotatably supported on the main motor housing 101. The third planet carrier 305 is in pin connection with the fourth planet carrier 306.

A main body of the secondary reducer 400 is a single-row single-stage planetary gear mechanism. The secondary reducer 400 includes a fourth sun gear 401, a fourth gear ring 403, a fourth planetary gear 402, a second planetary gear shaft 404, a fifth planet carrier 405 and a sixth planet carrier 406. The fourth sun gear 401 is in splined connection with the rotor shaft 202. The fourth gear ring 403 is in splined connection with the secondary housing 902. The fourth planetary gear 402 is engaged with the fourth sun gear 401 and the fourth gear ring 403 for transmission. The second planetary gear shaft 404 is configured to rotatably support the fourth planetary gear 402. The fifth planet carrier 405 is configured to rotatably support the second planetary gear shaft 404, and is rotatably supported on the auxiliary motor housing 201. The sixth planet carrier 406 is configured to rotatably support the second planetary gear shaft 404. The fifth planet carrier 405 is in pin connection with the sixth planet carrier 406.

A main body of the dual-planetary gear set mechanism 500 is a single-row two-stage planetary gear mechanism with a characteristic parameter (referring to the gear ratio between the gear ring and the sun gear) of 2. The dual-planetary gear set mechanism 500 includes a fifth sun gear 501, a first internal planetary gear 502, a first internal planetary gear 505, a first external planetary gear 503, a first external planetary gear shaft 506, a fifth gear ring 504, a seventh planet carrier 507 and an eighth planet carrier 508. The fifth sun gear 501 is rotatably supported on the first half shaft 801 through a first needle bearing 509 and a second needle bearing 510, and is in splined connection with the first gear ring 605. The first internal planetary gear 502 is in external engagement with the fifth sun gear 501 for transmission. The first internal planetary gear 505 is configured to rotatably support the first internal planetary gear 502. The first external planetary gear 503 is in external engagement with the first internal planetary gear 502 for transmission. The first external planetary gear shaft 506 is configured to rotatably support the first external planetary gear 503. The fifth gear ring 504 is in internal engagement with the first external planetary gear 503, and is in splined connection with the sixth planet carrier 406. The seventh planet carrier 507 is configured to rotatably support the first internal planetary gear 505 and the first external planetary gear shaft 506. The eighth planet carrier 508 is configured to rotatably support the first internal planetary gear 505 and the first external planetary gear shaft 506. The seventh planet carrier 507 is in pin connection with the eighth planet carrier 508.

The first flange 803 is in splined connection with an outer end of the first half shaft 801, so as to output a torque of the first half shaft 801 to wheels at a first side of the vehicle. A first fixing nut 805 is threadedly connected to the first half shaft 801 at an outer center of the first flange 803 to axially fix the first flange 803. Between the first flange 803 and the auxiliary motor housing 201 is provided with a first rubber seal ring 807 for sealing.

The second flange 804 is in splined connection with an outer end of the second half shaft 802, so as to output a torque of the second half shaft 801 to wheels at a second side of the vehicle. A second fixing nut 806 is threadedly connected to the second half shaft 802 at an outer center of the second flange 804 to axially fix the second flange 804. Between the second flange 804 and the main motor housing 101 is provided with a fourth rubber seal ring 810 for sealing.

A driving part 711 of the first clutch 710 is in splined connection with the eighth planet carrier 508. A driven part 712 of the first clutch 710 is in splined connection with the fifth sun gear 501.

A driving part of the second clutch 720 is integrally formed with the driving part 711 of the first clutch 710. A driven part of the second clutch 720 is integrally formed with the second gear ring 606.

The operation principles of the dual-mode electric drive axle provided herein will be illustrated below with reference to the accompanying drawings and embodiments.

Figure 3:
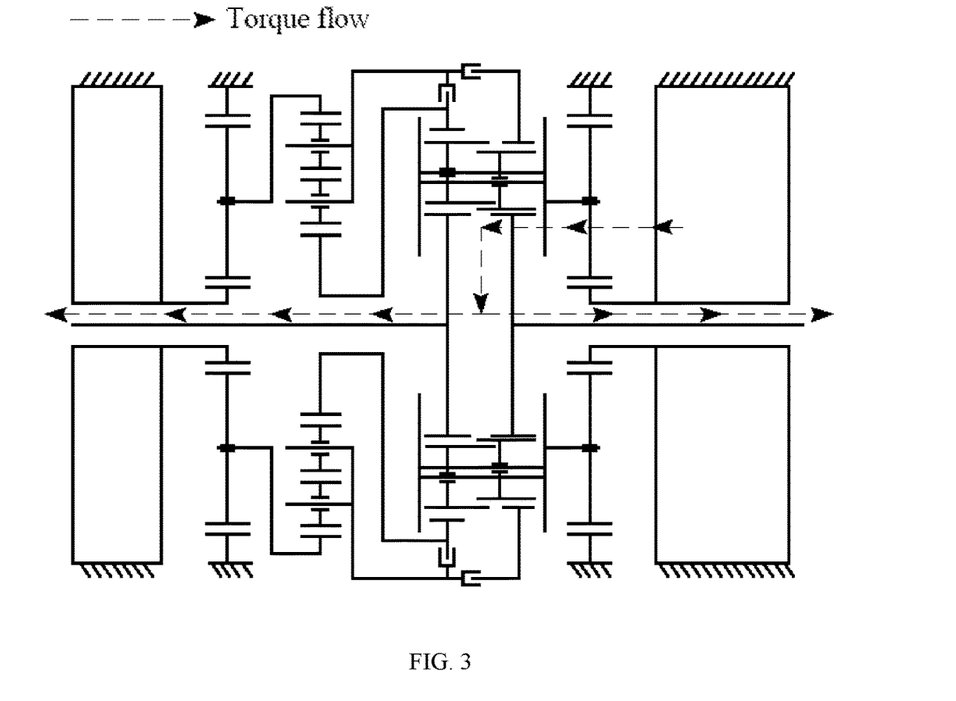
FIG. 3 schematically depicts a torque flow of the dual-mode electric drive axle under a main motor independent-drive mode according to an embodiment of the present disclosure.

As shown in FIG. 3, when the dual-mode electric drive axle operates in a main motor independent-drive mode, the first clutch 710 and the second clutch 720 are both in a disengaged state. At this time, the main motor 100 generates the driving torque, and the auxiliary motor 200 is in a static state, and does not participate in the transmission. Under the main motor independent-drive mode, the primary reducer 300 performs deceleration and torque increase, and transmits the driving torque to the spur gear differential 600. Then, the driving torque is evenly distributed to the first half shaft 801 and the second half shaft 802 through the spur gear differential 600. The torque of the first half shaft 801 is $T_l$ and the torque of the second half shaft 802 is $T_r$, and $$T_l = T_r = \frac{1}{2}(k_1 + 1)T_{m1},$$

where kF is a planetary-row characteristic parameter of the primary reducer 300, and $T_{m1}$ is the driving torque generated by the main motor 100.

Figure 4:
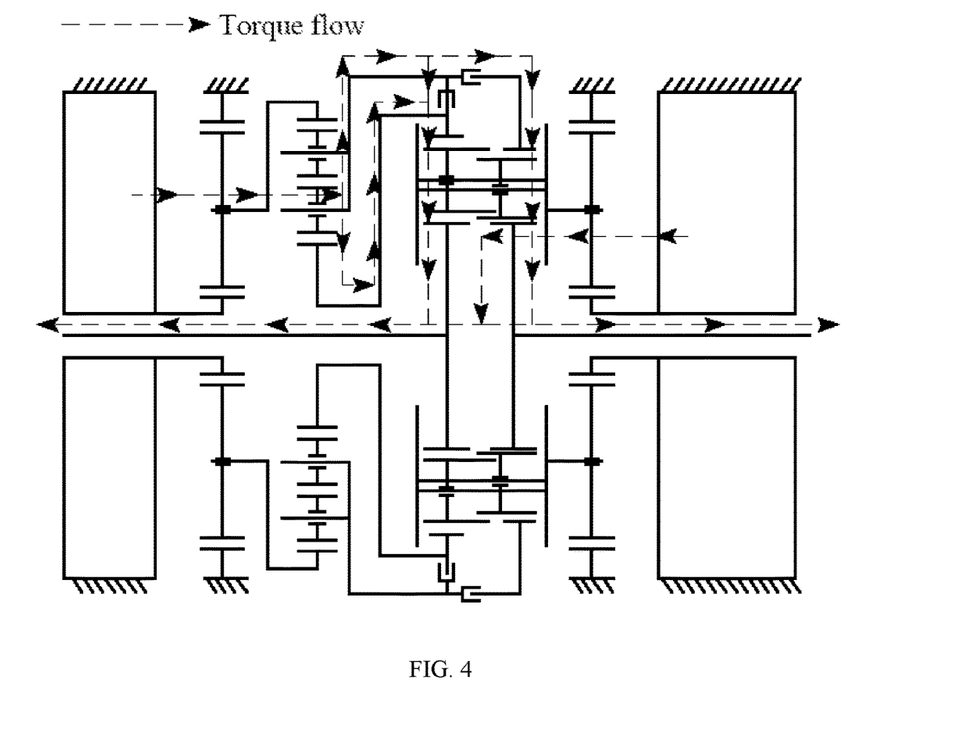
FIG. 4 schematically depicts a torque flow of the dual-mode electric drive axle under a dual-motor torque coupling mode according to an embodiment of the present disclosure.

As shown in FIG. 4, when the dual-mode electric drive axle operates in a dual-motor torque coupling mode, the first clutch 710 is in a disengaged state, and the second clutch 720 is in an engaged state. At this time, the main motor 100 and the auxiliary motor 200 both output a torque. Under the dual-motor torque coupling mode, the primary reducer 300 performs deceleration and torque increase, and transmits the driving torque to the spur gear differential 600. Then, the driving torque is evenly distributed to the first half shaft 801 and the second half shaft 802 through the spur gear differential 600. The auxiliary motor 200 rotates forward to generate a positive torque. The secondary reducer 400 performs deceleration and torque increase, and transmits the positive torque from the auxiliary motor 200 to the fifth gear ring 504, which is then transformed into a pair of torques having the same magnitude and direction, where one of the pair of torques is transmitted through the fifth sun gear 501 and the first gear ring 605 to the first planetary gear 603 of the spur gear differential 600; and the other of the pair of torques is transmitted through the eighth planet carrier 508, the second clutch 720 and the second gear ring 606 to the second planetary gear 604 of the spur gear differential 600. The torques to the first planetary gear 603 and the second planetary gear 604 are then evenly distributed to the first half shaft 801 and the second half shaft 802. Then the torque to the first half shaft 801 is superposed with the driving torque distributed to the first half shaft 801, the torque of the second half shaft 802 is superposed with the driving torque distributed to the second half shaft 802, and then the torques are output together. Moreover, the dual-planetary gear set mechanism 500 has a "differential" function under this mode to ensure that the torque generated by the auxiliary motor 200 can be evenly distributed to the first half shaft 801 and the second half shaft 802 even when rotational speeds of the first half shaft and the second half shaft are different, so as to superpose the driving torque and the torque at the spur gear differential 600. At this time, $$T_l = T_r = \frac{1}{2}(k_1 + 1)T_{m1} + \frac{1}{2}(k_3 + 1)T_{m2},$$

where $k_3$ is a planetary-row characteristic parameter of the secondary reducer 400, and $T_{m2}$ is the torque generated by the auxiliary motor 200.

Figure 5:
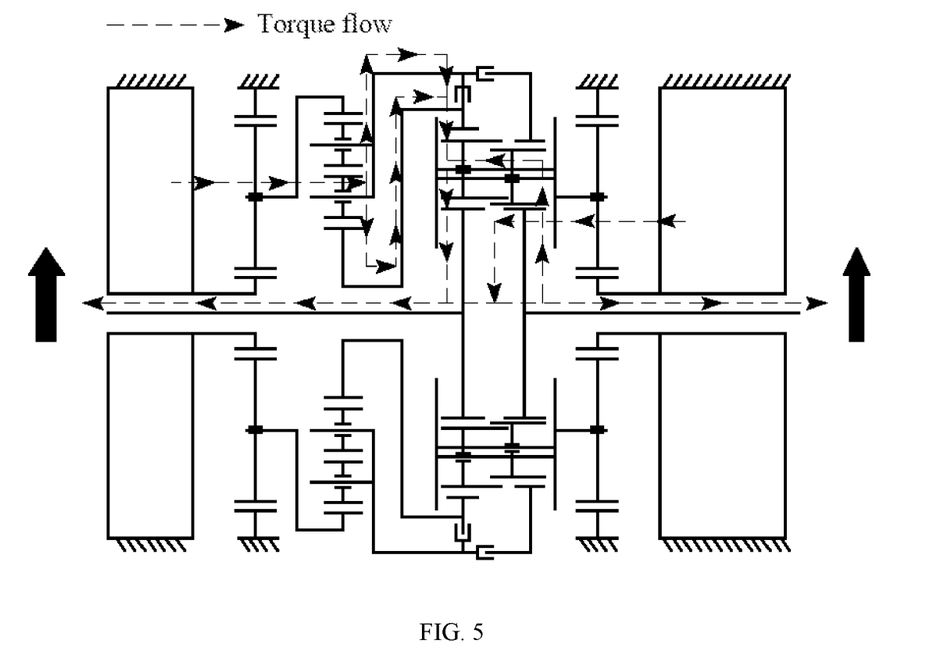
FIG. 5 schematically depicts a torque flow of the dual-mode electric drive axle under a torque vectoring mode in the case of increasing torque to wheels at the first sides according to an embodiment of the present disclosure.
Figure 6:
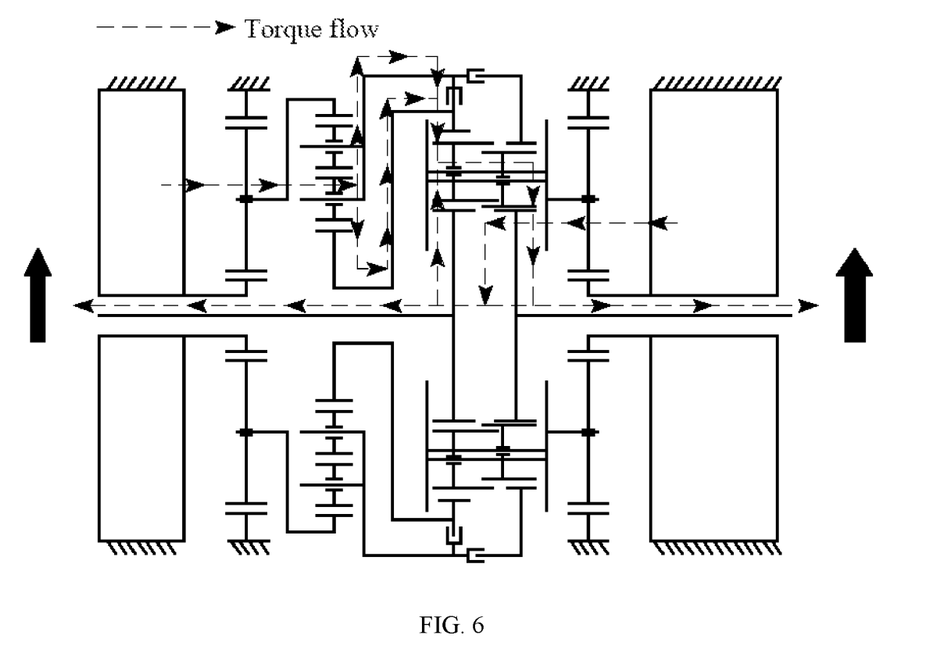
FIG. 6 schematically depicts a torque flow of the dual-mode electric drive axle under the TV mode in the case of increasing torque to wheels at the second sides according to an embodiment of the present disclosure.

As shown in FIGS. 5-6, when the dual-mode electric drive axle operates in a TV mode, the first clutch 710 is in an engaged state, and the second clutch 720 is in a disengaged state. Under the TV mode, the primary reducer 300 performs deceleration and torque increase, and transmit the driving torque from the main motor 100 to the spur gear differential 600. Then, the driving torque is evenly distributed to the first half shaft 801 and the second half shaft 802 through the spur gear differential 600. The secondary reducer 400 performs deceleration and torque increase, and transmits the torque from the auxiliary motor 200 to the fifth gear ring 504. Due to the turn-on of the first clutch 710 to enable the self-locking of the dual-planetary gear set mechanism 500 and achieve direct transmission (a speed ratio is 1). The torque transmitted to the fifth gear ring 504 is transmitted through the dual-planetary gear set mechanism 500, the first clutch 710 and the first gear ring 605 to the first planetary gear 603, such that a torque of one half shaft reduces and a torque of another half shaft increases. At this time, the torque of the first half shaft 801

$$T_l = \frac{1}{2}(k_1 + 1)T_{m1} - \frac{1}{2}\frac{(k_3 + 1)}{k_0}T_{m2};$$

and the torque of the second half shaft 802

$$T_r = \frac{1}{2}(k_1 + 1)T_{m1} + \frac{1}{2}\frac{(k_3 + 1)}{k_0}T_{m2},$$

where $k_0$ is a transmission ratio of the first gear ring 605 to the first planetary gear 603. In an embodiment, if the torque generated by the auxiliary motor 200 $T_{m2}$ has a positive direction (a direction the same to the the driving torque), the torque of the first half shaft 801 reduces and the torque of second half shaft 802 increases.

The operation effects of the TV mode will be described below with reference to accompanying drawings and embodiments.

Figure 7:
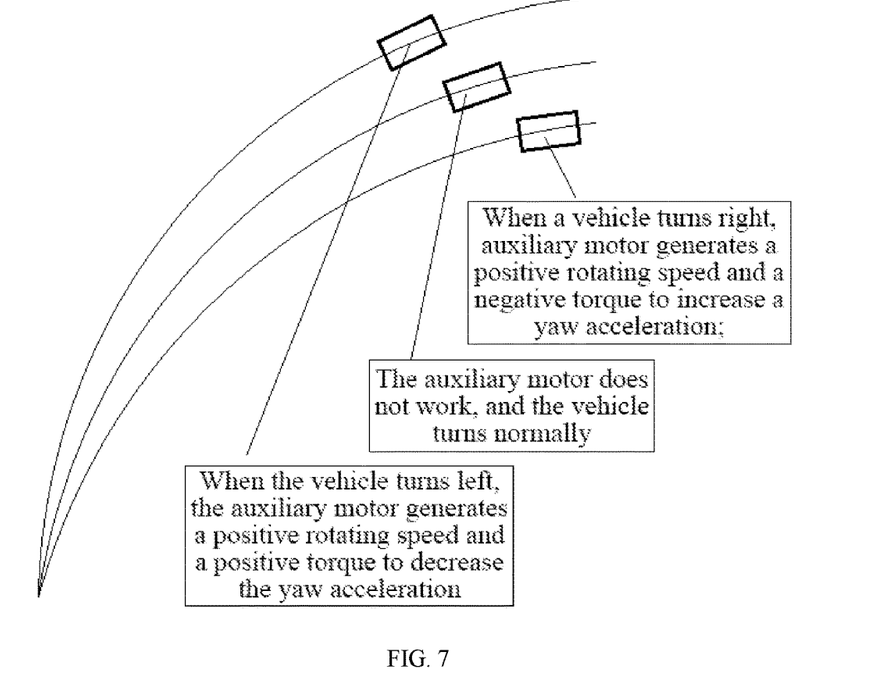
FIG. 7 illustrates a route of a vehicle having the dual-mode electric drive axle according to an embodiment of the present disclosure when turning right.

As shown in FIG. 7, when the vehicle turns right, due to constraint of turning geometry, a rotating speed of the wheels at the first side of the vehicle is higher than that of the wheels at the second side. A rotating speed of the first sun gear of the spur gear differential increases, and a rotating speed of the first gear ring decreases. Under this condition, revolution speed of the second planetary gear of the spur gear differential is much greater than rotation speed thereof, such that the rotating speed of the first gear ring is still positive, and a rotating speed of the auxiliary motor is positive. If the TV mode is operated at this time and the torque from the auxiliary motor is negative, a driving torque of the wheels at the first side increases and a driving torque of the wheels at the second side decreases. A driving force $F_l$ of the wheels at the first side increases, and a driving force $F_r$ of the wheels at the second side decreases, so as to generate a yawing moment M having the same direction as a yaw velocity of the vehicle. The yawing moment M enables the yaw of the vehicle to increase to improve handling and steering maneuverability. If the torque from the auxiliary motor is positive, the driving torque of the wheels at the first side decreases and the driving torque of the wheels at the second side increases. Such that the driving force $F_l$ of the wheels at the first side decreases, and the driving force $F_r$ of the wheels at the second side increases, so as to generate a yawing moment M having opposite direction to the yaw velocity of the vehicle. The yawing moment M enables the yaw of the vehicle to decrease, so as to increase vehicle understeer, improving the steering stability and active safety.

Figure 8:
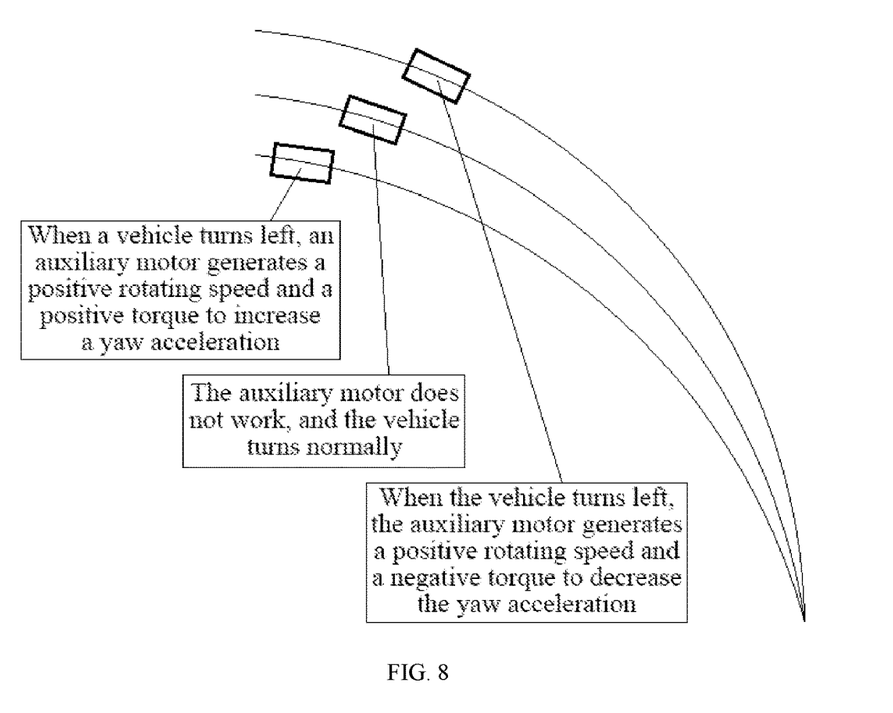
FIG. 8 illustrates a route of the vehicle having the dual-mode electric drive axle according to an embodiment of the present disclosure when turning left.

Similarly, as shown in FIG. 8, when the vehicle turns left, due to constraint of turning geometry, the rotating speed of the wheels at the second side is higher than that of the wheels at the first side. The rotating speed of the first sun gear of the spur gear differential decreases, and the rotating speed of the first gear ring increases and is positive, such that the rotating speed of the auxiliary motor is positive. If the TV mode is started at this time and the torque from the auxiliary motor is positive, the driving torque of the wheels at the second side increases and the driving torque of the wheels at the first side decreases. The driving force $F_l$ of the wheels at the first side decreases, and the driving force $F_r$ of the wheels at the second side increases, so as to generate a yawing moment M having the same direction as the yaw velocity of the vehicle. The yawing moment M enables the yaw of the vehicle to increase to improve handling and steering maneuverability. If the torque from the auxiliary motor is negative, the driving torque of the wheels at the second side decreases and the driving torque of the wheels at the first side increases. Such that the driving force $F_l$ of the wheels at the first side increases, and the driving force $F_r$ of the wheels at the second side decreases, so as to generate a yawing moment M having opposite direction to the yaw velocity of the vehicle. The yawing moment M enables the yaw of the vehicle to decrease, so as to increase vehicle understeer, improving the steering stability and active safety.

In an embodiment, when the vehicle is in trouble such as wheelslip and losing power because any wheel is stuck in a mud puddle or vehicle is driven into low adhesion roads such as snow and ice, the TV modes still can be operated. By controlling the positive or negative torque generated by auxiliary motor, a drive shaft torque is transferred from a slipping wheel on a low adhesion side to the non-slipping wheel on a higher adhesion side, so as to restore the driving force, improving the trafficability.

Although some embodiments of the present invention have been illustrated above, any modifications to these embodiments can be made by those skilled in the art without departing from the principle and spirit of the present invention. The scope of the present invention is defined solely by the appended claims or equivalents thereof.

What is claimed is:

1. A dual-mode electric drive axle with torque parallel coupling and torque vectoring, comprising:
   a main motor;
   an auxiliary motor;
   a first flange;
   a second flange;
   a first half shaft;
   a second half shaft;
   a spur gear differential;
   a primary reducer;
   a secondary reducer;
   a dual-planetary gear set mechanism;
   a first clutch;
   a second clutch;
   a primary housing; and
   a secondary housing;
   wherein the main motor is configured to output a driving torque to drive a vehicle;
   the auxiliary motor is configured to output a torque to realize torque vectoring, or configured to output a torque to be coupled with the driving torque output by the main motor to drive the vehicle;
   the spur gear differential is configured to evenly distribute a torque transmitted thereto to the first half shaft and the second half shaft, allow the first half shaft and the second half shaft to rotate at different angular speeds, and receive the torque from the auxiliary motor to achieve torque coupling or torque vectoring;
   the primary reducer is configured to perform deceleration and torque increase, and transmit the driving torque output by the main motor;
   the secondary reducer is configured to perform deceleration and torque increase, and transmit the torque output by the auxiliary motor;
   the dual-planetary gear set mechanism is configured to convert a torque output by the secondary reducer into a pair of equal torques having the same direction;
   the first clutch is configured to control the dual-mode electric drive axle to switch to a torque vectoring mode;
   the second clutch is configured to control the dual-mode electric drive axle to switch to a dual-motor torque coupling mode;
   the primary housing is configured to accommodate the primary reducer and the spur gear differential, and fix the main motor; and
   the secondary housing is arranged at a side of the primary housing, and is boltedly connected to the primary housing; and the secondary housing is configured to accommodate the secondary reducer and the dual-planetary gear set mechanism, and fix the auxiliary motor;
   the main motor is a hollow-shaft inner-rotor permanent magnet synchronous motor; the main motor, the second flange and the second half shaft are arranged at a first side of the spur gear differential; the driving torque generated by the main motor is output by a rotor shaft of the main motor; and the second half shaft passes through a center hole of the rotor shaft of the main motor;
   the auxiliary motor is a hollow-shaft inner-rotor permanent magnet synchronous motor; the auxiliary motor, the first flange and the first half shaft are arranged at a second side of the spur gear differential; the torque generated by the auxiliary motor is output by a rotor shaft of the auxiliary motor; and the first half shaft passes through a center hole of the rotor shaft of the auxiliary motor;
   the spur gear differential comprises a first sun gear, a second sun gear, a first planetary gear, a second planetary gear, a first gear ring, a second gear ring, a first planet carrier, a second planet carrier and a needle roller thrust bearing;
   the first sun gear is in splined connection with an inner end of the first half shaft; the second sun gear is in splined connection with an inner end of the second half shaft;
   the first planetary gear is in external engagement with the first sun gear for transmission; the second planetary gear is in external engagement with the second sun gear and the first planetary gear for transmission;
   the first gear ring is in internal engagement with the first planetary gear for transmission; the second gear ring is in internal engagement with the second planetary gear for transmission;
   the first planet carrier is configured to rotatably support the first planetary gear and the second planetary gear; the second planet carrier is configured to rotatably support the first planetary gear and the second planetary gear; the first planet carrier is in pin connection with the second planet carrier to form a differential housing; and the needle roller thrust bearing is arranged between the first sun gear and the second sun gear.

2. The dual-mode electric drive axle of claim 1, wherein a main body of the primary reducer is a single-row single-stage planetary gear mechanism;

the primary reducer comprises a third sun gear, a third gear ring, a third planetary gear, a first planetary gear shaft, a third planet carrier and a fourth planet carrier; and the third sun gear is in splined connection with the rotor shaft of the main motor; the third gear ring is fixedly connected to the primary housing; the third planetary gear is engaged with the third sun gear and the third gear ring for transmission; the first planetary gear shaft is configured to rotatably support the third planetary gear; the third planet carrier is configured to rotatably support the first planetary gear shaft, and is fixedly connected to the second planet carrier; the fourth planet carrier is configured to rotatably support the first planetary gear shaft, and is rotatably supported on a main motor housing; and the third planet carrier is in pin connection with the fourth planet carrier.

3. The dual-mode electric drive axle of claim 1, wherein a main body of the secondary reducer is a single-row single-stage planetary gear mechanism;

the secondary reducer comprises a third sun gear, a third gear ring, a third planetary gear, a first planetary gear shaft, a third planet carrier and a fourth planet carrier; and the third sun gear is in splined connection with the rotor shaft of the auxiliary motor; the third gear ring is fixedly connected to the secondary housing; the third planetary gear is engaged with the third sun gear and the third gear ring for transmission; the first planetary gear shaft is configured to rotatably support the third planetary gear; the third planet carrier is configured to rotatably support the first planetary gear shaft, and is rotatably supported on an auxiliary motor housing; the fourth planet carrier is configured to rotatably support the first planetary gear shaft; and the third planet carrier is in pin connection with the fourth planet carrier.

4. The dual-mode electric drive axle of claim 3, wherein a main body of the dual-planetary gear set mechanism is a single-row two-stage planetary gear mechanism with a characteristic parameter of 2;

the dual-planetary gear set mechanism comprises a fourth sun gear, a first internal planetary gear, a first internal planetary gear shaft, a first external planetary gear, a first external planetary gear shaft, a fourth gear ring, a fifth planet carrier and a sixth planet carrier; and the fourth sun gear is rotatably supported on the first half shaft through a needle roller bearing, and is fixedly connected to the first gear ring; the first internal planetary gear is in external engagement with the fourth sun gear for transmission; the first internal planetary gear shaft is configured to rotatably support the first internal planetary gear; the first external planetary gear is in external engagement with the first internal planetary gear for transmission; the first external planetary gear shaft is configured to rotatably support the first external planetary gear; the fourth gear ring is in internal engagement with the first external planetary gear, and is in splined connection with the fourth planet carrier; the fifth planet carrier is configured to rotatably support the first internal planetary gear shaft and the first external planetary gear shaft; the sixth planet carrier is configured to rotatably support the first internal planetary gear shaft and the first external planetary gear shaft; and the fifth planet carrier is in pin connection with the sixth planet carrier.

5. The dual-mode electric drive axle of claim 4, wherein a driving part of the first clutch is in splined connection with the sixth planet carrier; and a driven part of the first clutch is in splined connection with the fourth sun gear; and a driving part of the second clutch is integrally formed with the driving part of the first clutch; and a driven part of the second clutch is integrally formed with the second gear ring.

6. The dual-mode electric drive axle of claim 1, wherein the first flange is in splined connection with an outer end of the first half shaft, so as to output a torque of the first half shaft to wheels at a first side of the vehicle; and a first fixing nut is threadedly connected to the first half shaft at an outer center of the first flange to axially fix the first flange; and the second flange is in splined connection with an outer end of the second half shaft, so as to output a torque of the second half shaft to wheels at a second side of the vehicle; and a second fixing nut is threadedly connected to the second half shaft at an outer center of the second flange to axially fix the second flange.

7. The dual-mode electric drive axle of claim 1, wherein when the dual-mode electric drive axle works under a main motor independent-drive mode, the first clutch and the second clutch are both in a disengaged state; the vehicle is driven by the driving torque output by the main motor; and the auxiliary motor is in an off state, and does not participate in transmission;

when the dual-mode electric drive axle works under the dual-motor torque coupling mode, the first clutch is in a disengaged state, and the second clutch is in an engaged state; and the vehicle is driven jointly by the driving torque output by the main motor and the torque output by the auxiliary motor; and when the dual-mode electric drive axle works under the torque vectoring mode, the first clutch is in an engaged state, and the second clutch is in a disengaged state; the driving torque output by the main motor is configured to drive the vehicle; and the torque output by the auxiliary motor is configured to realize lateral torque transfer between wheels at two sides of the vehicle.

\* \* \* \* \*